United States Patent
Jothilingam et al.

(10) Patent No.: US 12,057,882 B2
(45) Date of Patent: Aug. 6, 2024

(54) EFFICIENT REMOTE PHY DATAPLANE MANAGEMENT FOR A CABLE SYSTEM

(71) Applicant: ARRIS Enterprises LLC, Suwanee, GA (US)

(72) Inventors: Vasudevan Jothilingam, Bengaluru (IN); Kumara Swamy Tadikavagilu Venkatappa, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/370,838

(22) Filed: Sep. 20, 2023

(65) Prior Publication Data

US 2024/0146414 A1    May 2, 2024

Related U.S. Application Data

(63) Continuation of application No. 17/207,120, filed on Mar. 19, 2021, now abandoned.

(60) Provisional application No. 62/992,348, filed on Mar. 20, 2020.

(51) Int. Cl.
| | |
|---|---|
| *H04B 10/69* | (2013.01) |
| *H04B 10/2575* | (2013.01) |
| *H04B 10/25* | (2013.01) |
| *H04B 10/27* | (2013.01) |
| *H04L 12/28* | (2006.01) |
| *H04L 49/901* | (2022.01) |
| *H04N 21/61* | (2011.01) |

(52) U.S. Cl.
CPC ....... *H04B 10/25751* (2013.01); *H04B 10/25* (2013.01); *H04B 10/27* (2013.01); *H04B 10/69* (2013.01); *H04L 12/2801* (2013.01); *H04L 49/901* (2013.01); *H04N 21/6168* (2013.01)

(58) Field of Classification Search
CPC .. H04B 10/25751; H04B 10/25; H04B 10/27; H04B 10/69; H04L 12/2801; H04L 49/901; H04L 12/2803; H04L 12/2874; H04L 12/2858; H04N 21/6168
USPC ................. 398/43–103, 115–117, 202–214
See application file for complete search history.

(56) References Cited

U.S. PATENT DOCUMENTS

| | | |
|---|---|---|
| 5,495,482 A | 2/1996 | White et al. |
| 6,434,620 B1 | 8/2002 | Boucher et al. |
| 6,985,492 B1 | 1/2006 | Thi et al. |

(Continued)

OTHER PUBLICATIONS

International Search Report and Written Opinion Re: Application No. PCT/US021/023245 (dated May 27, 2021).

(Continued)

*Primary Examiner* — Dibson J Sanchez
(74) *Attorney, Agent, or Firm* — Chernoff, Vilhauer, McClung & Stenzel, LLP (57) ABSTRACT

A cable distribution system that includes a headend connected to a plurality of customer devices through a transmission network that includes a remote fiber node that converts digital data to analog data suitable for the plurality of customer devices. The remote fiber node receiving a downstream external protocol interface packet that includes a header portion and a data portion in memory. The remote fiber node encoding and transmitting the data portion to at least one of the plurality of customer devices, wherein the data portion is transferred from the memory using direct memory access based upon a buffer descriptor for the encoding.

18 Claims, 11 Drawing Sheets

(56) References Cited

U.S. PATENT DOCUMENTS

| | | | |
|---|---|---|---|
| 7,158,520 B1* | 1/2007 | Sindhu | H04L 49/9094 |
| | | | 709/215 |
| 7,356,039 B1 | 4/2008 | DiMambro | |
| 7,701,951 B2 | 4/2010 | Chapman et al. | |
| 8,085,780 B1 | 12/2011 | Lim et al. | |
| 8,121,116 B1* | 2/2012 | Healy | H04L 47/564 |
| | | | 370/235 |
| 9,112,708 B1 | 8/2015 | Arad et al. | |
| 9,118,576 B2 | 8/2015 | Roitshtein | |
| 9,344,319 B1* | 5/2016 | Harrington | H04L 27/34 |
| 9,916,269 B1 | 3/2018 | Machulsky et al. | |
| 10,701,002 B1 | 6/2020 | Schroder | |
| 2005/0132144 A1* | 6/2005 | Illikkal | G06F 12/0835 |
| | | | 711/144 |
| 2006/0268913 A1 | 11/2006 | Singh et al. | |
| 2007/0160052 A1 | 6/2007 | Okada | |
| 2008/0134262 A1 | 6/2008 | Jung et al. | |
| 2008/0159140 A1 | 7/2008 | Robinson et al. | |
| 2009/0016218 A1* | 1/2009 | Hong | H04L 47/10 |
| | | | 370/231 |
| 2009/0285233 A1* | 11/2009 | Al-Banna | H04L 12/2889 |
| | | | 370/419 |
| 2009/0310596 A1* | 12/2009 | Joyce | H04L 12/2801 |
| | | | 370/352 |
| 2010/0177784 A1* | 7/2010 | Asati | H04L 12/4633 |
| | | | 370/463 |
| 2011/0219195 A1* | 9/2011 | Habusha | G06F 12/0862 |
| | | | 711/137 |
| 2011/0283068 A1 | 11/2011 | Hung et al. | |
| 2013/0070825 A1 | 3/2013 | Chapman | |
| 2014/0079060 A1 | 3/2014 | Healy et al. | |
| 2014/0199080 A1* | 7/2014 | Ramesh | H04B 10/27 |
| | | | 398/116 |
| 2015/0149652 A1* | 5/2015 | Singer | H04L 69/16 |
| | | | 709/231 |
| 2016/0366052 A1* | 12/2016 | Chapman | H04L 45/66 |
| 2017/0339259 A1 | 11/2017 | Arad et al. | |
| 2018/0288197 A1 | 10/2018 | Zenberg | |
| 2019/0238459 A1 | 8/2019 | Schmilovici | |
| 2020/0245346 A1* | 7/2020 | Chapman | H04W 72/1268 |

OTHER PUBLICATIONS

Alharbi Zi Yao et al: "Performance Comparison of R-PHY and R-MACPHY Modular Cable Access Network Architectures". IEEE Transactions on Broadcasting., [Online] vol. 64. No. 1. Mar. 1, 2018 (Mar. 1, 2018). pp. 128-145. XP055805216.

DCA-MHAv2, Remote Downstream External PHY Interface Specification, May 2018, Cable Labs, All Document. (Year: 2018).

* cited by examiner

EFFICIENT REMOTE PHY DATAPLANE MANAGEMENT FOR A CABLE SYSTEM

CROSS REFERENCE TO RELATED APPLICATIONS

This application is a continuation of U.S. patent application Ser. No. 17/207,120 filed on Mar. 19, 2021, which claims benefit of U.S. Provisional Patent Application No. 62/992,348 filed Mar. 20, 2020, the entirety of which is incorporated herein by reference.

BACKGROUND

The subject matter of this application relates to efficient remote PHY dataplane management for a cable system.

Cable Television (CATV) services provide content to large groups of customers (e.g., subscribers) from a central delivery unit, generally referred to as a "headend," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP (Voice over Internet Protocol), home automation/security, and so forth. These digital communication services, in turn, require not only communication in a downstream direction from the headend, through the HFC, typically forming a branch network and to a customer, but also require communication in an upstream direction from a customer to the headend typically through the HFC network.

To this end, CATV headends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
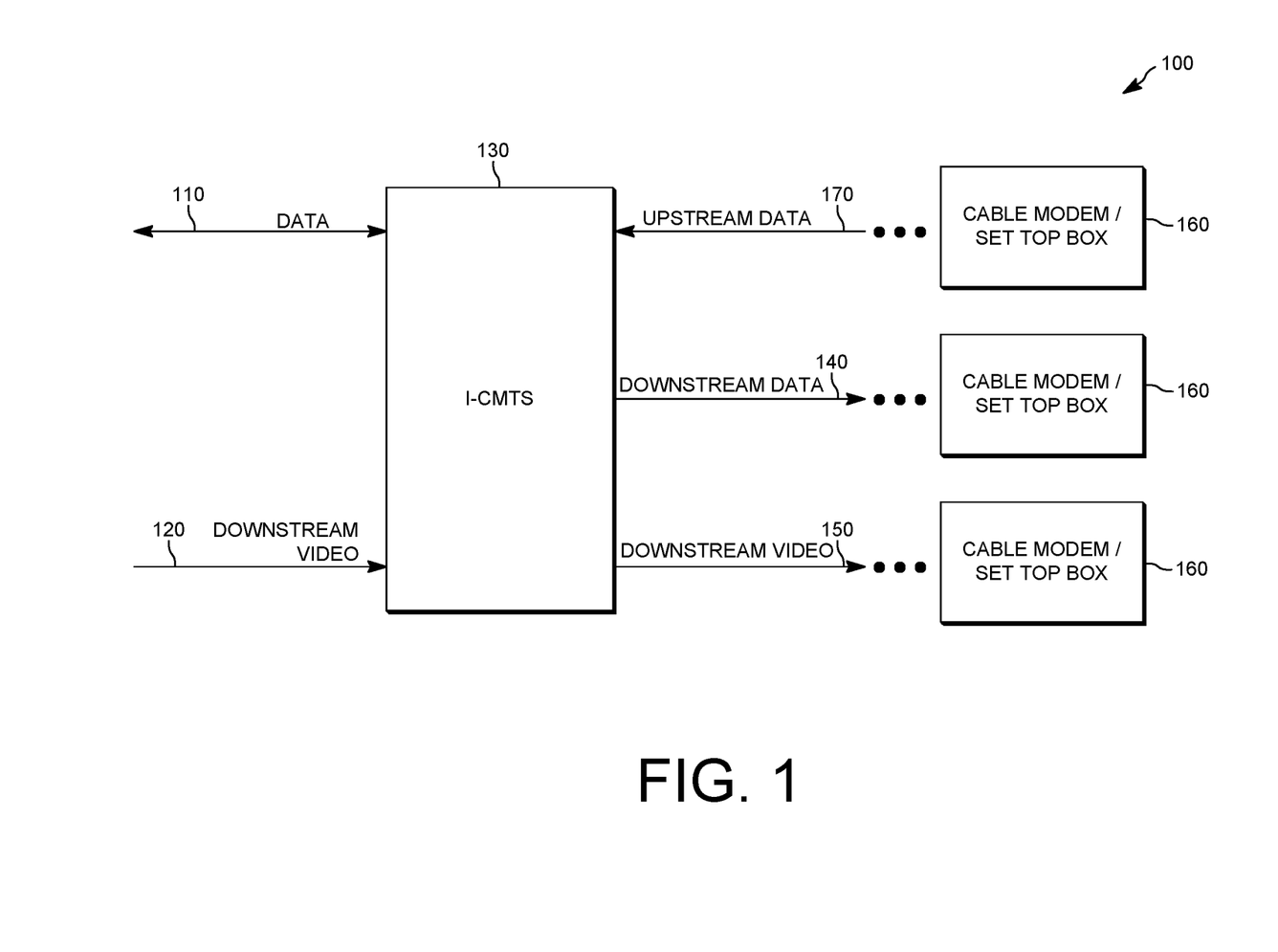
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
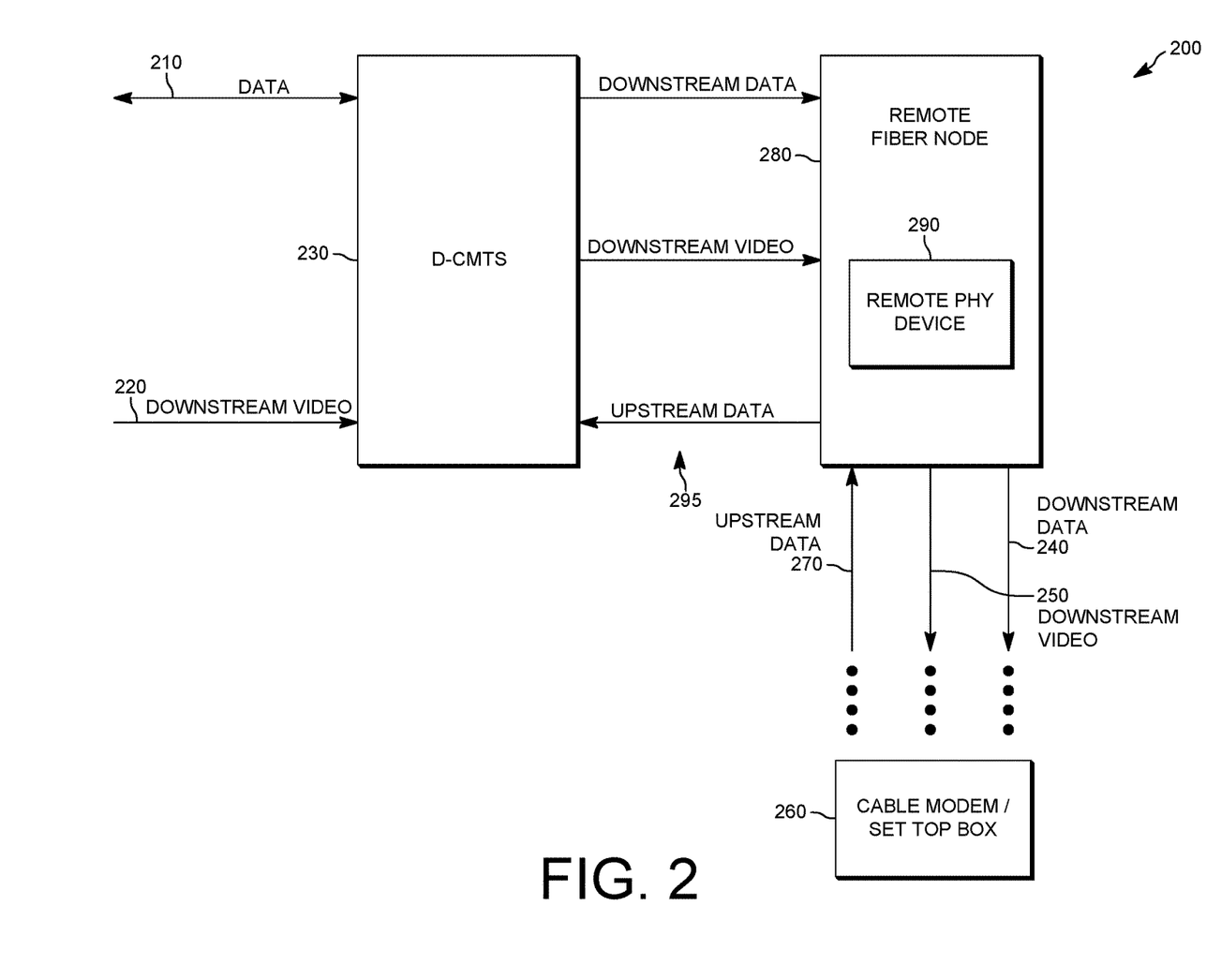
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the MAC and/or PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote fiber node 280 preferably includes a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or analog optics, to digital for transmission to the D-CMTS 230. As it may be observed, depending on the particular configuration, the R-PHY may move all or a portion of the DOCSIS MAC and/or PHY layers down to the fiber node.

Figure 3:
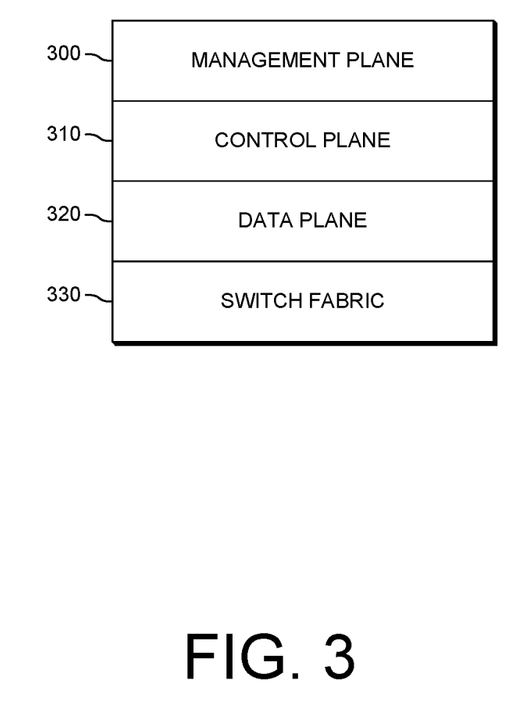
FIG. 3 illustrates a layered network processing stack.

Referring to FIG. 3, for data processing and for transferring data across a network, the architecture of the hardware and/or software may be configured in the form of a plurality of different planes, each of which performs a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, monitoring, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carries the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

Figure 4:
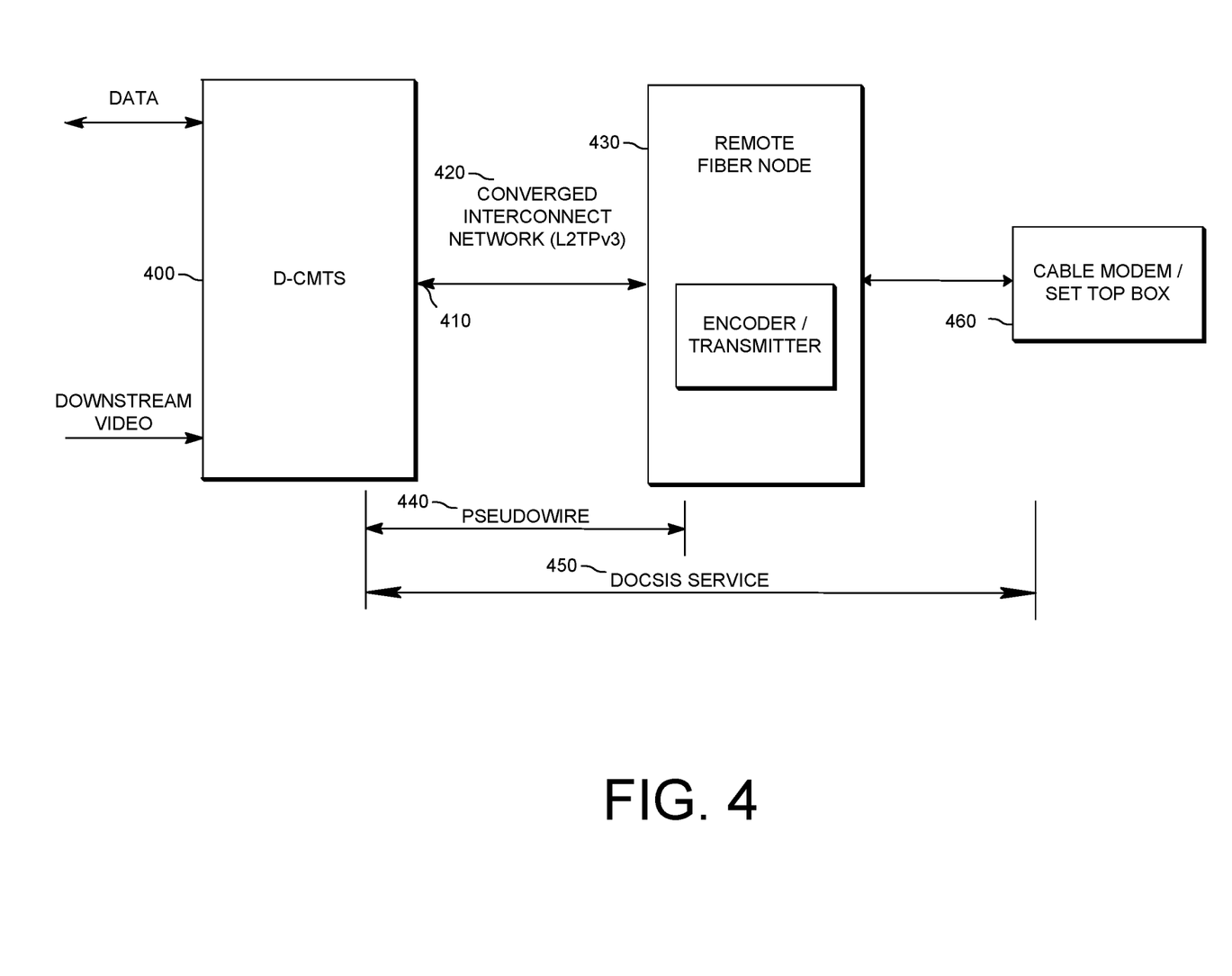
FIG. 4 illustrates interconnections between D-CMTS, a remote fiber node, and a cable modem/set top box.

Referring to FIG. 4, the D-CMTS 400 may include a Downstream External PHY Interface (DEPI) 410 which is an Internet Protocol tunnel, generally referred to as a pseudowire 440, that exists in the downstream direction between the DOCSIS MAC layer in the D-CMTS 400 and the remote fiber node 430. The pseudowire allows the IP network to carry a service without that service having to know the details of the IP network. In general, the IP tunnel may contain one or more pseudowires. A converged interconnect network 420 may be used between the DOCSIS MAC layer in the D-CMTS 400 and the remote fiber node 430, such as L2TPv3. A DOCSIS service 450 may be provided between the D-CMTS and the cable modem/set top box 460. The packets of data being provided between the D-CMTS and the remote fiber node may include multiple channels. For example, the channels (e.g., services) may include data traffic, video traffic, NDF traffic, DOCSIS 1.0 traffic, DOCSIS 2.0 traffic, DOCSIS 3.0 traffic, DOCSIS 3.1 traffic, out of band traffic, SCTE 55-1 traffic, and/or SCTE 55-2 traffic.

The data plane encapsulation of DEPI 410 may have, for example, two types of encapsulations. One type of encapsulation is a D-MPT (DOCSIS MPEG Transport) which includes DOCSIS frames over MPEG over L2TP. Another type of encapsulation includes PSP (Packet Streaming Protocol) which streams DOCSIS frames over L2TP.

Figure 5:
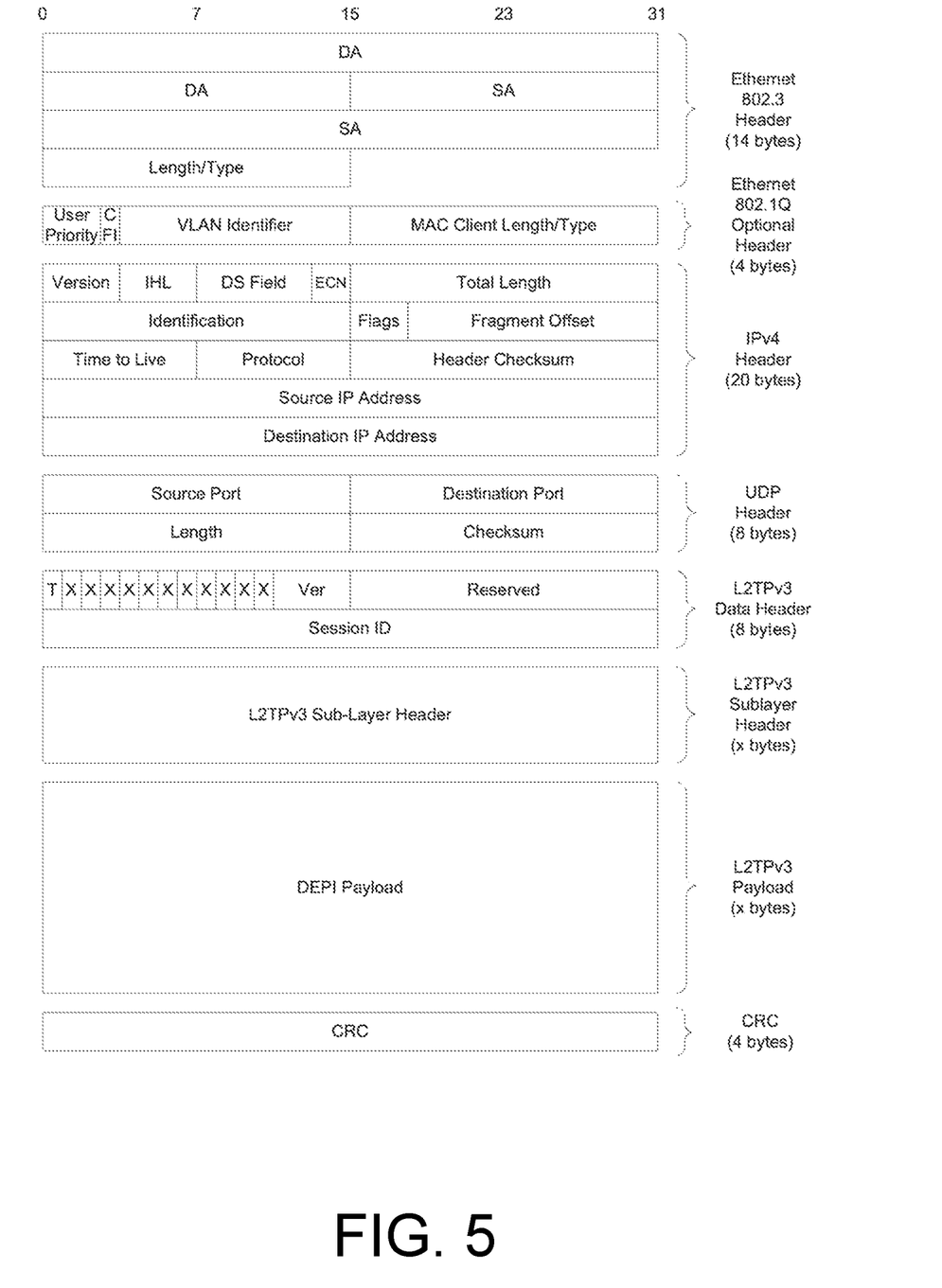
FIG. 5 illustrates an exemplary DEPI packet.

Referring to FIG. 5, an exemplary IP packet that contains L2TP is illustrated (generally referred to herein as a DEPI packet). The outer layer 2 encapsulation may be Ethernet (e.g., ETH Header). The next layer may be IPv4 or IPv6 as the layer 3 protocol (e.g., IP Header). The next layer may be L2TP with the first field being a 32-bit session ID. Preferably, the L2TP session ID lines up with the same spot that a UDP Source and Destination ports would to allow existing packet filters that can filter on UDP ports to be able to filter on an L2TP session ID. Preferably, if the L2TP session ID is all zeros then it is a control plane packet and if it is non-zero it is a data plane packet. The L2TP sub-layer header may be user definable, including DEPI header information (e.g., DEPI Header) for the DOCSIS data. Other configurations may likewise be used, as desired.

Figure 6:
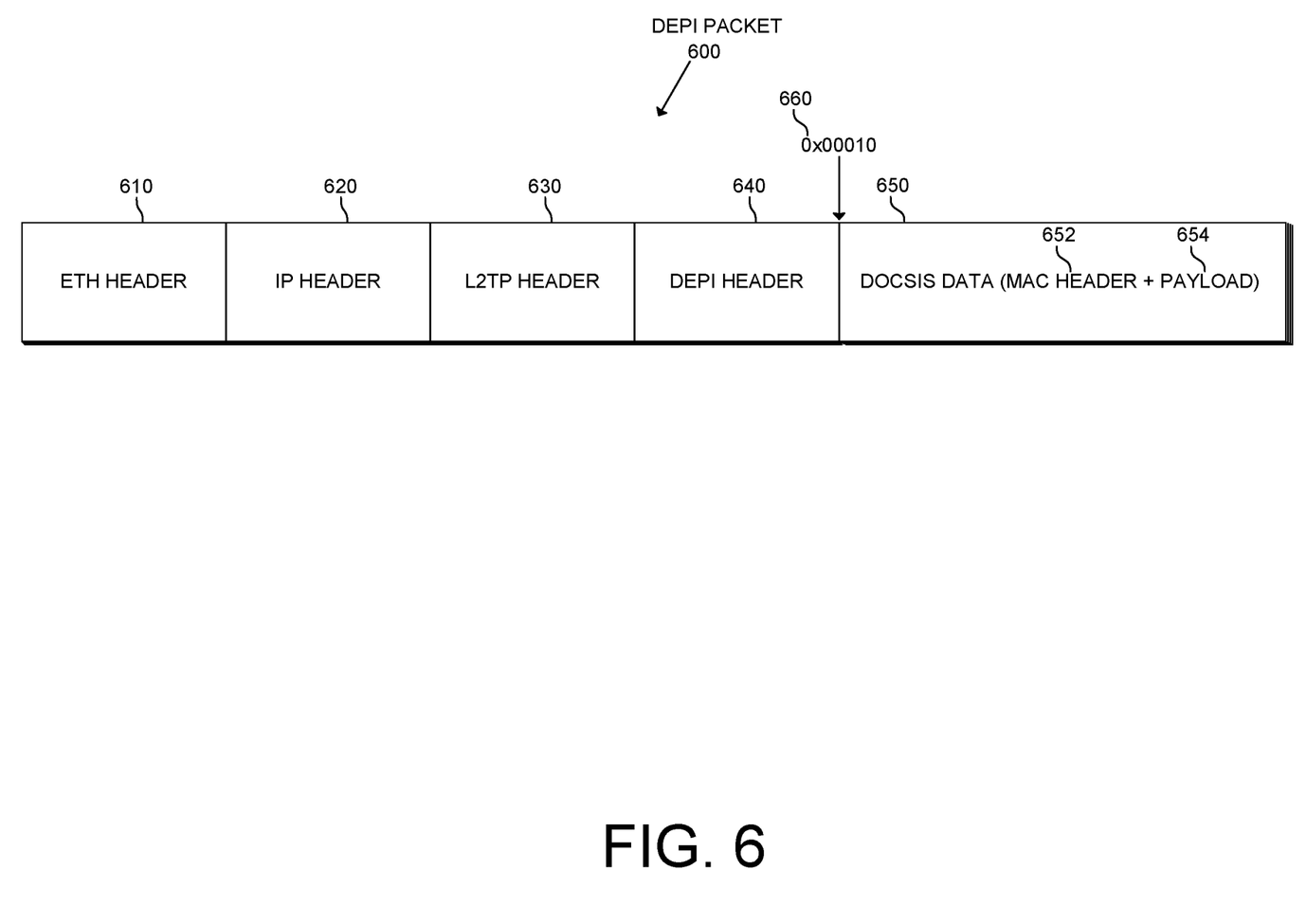
FIG. 6 illustrates an exemplary DEPI packet.

Referring to FIG. 6, a simplified view of an exemplary DEPI packet 600 is illustrated. The DEPI packet 600 includes an ETH Header 610, an IP Header 620, a L2TP Header 630, a DEPI Header 640, and a DOCSIS Data 650. The DOCSIS data 650 typically includes a MAC header 652 and a payload 654 to facilitate transmission of the payload 654 by the remote fiber node. The remote fiber node 430 terminates the DEPI packet 600 and forms a DOCSIS packet based upon the DOCSIS data 650 that is then encoded for transmission to the cable modem/set top box 460, such as using an analog QAM modulation provided to a coaxial cable interconnected to the cable modem/set top box 460.

Figure 7:
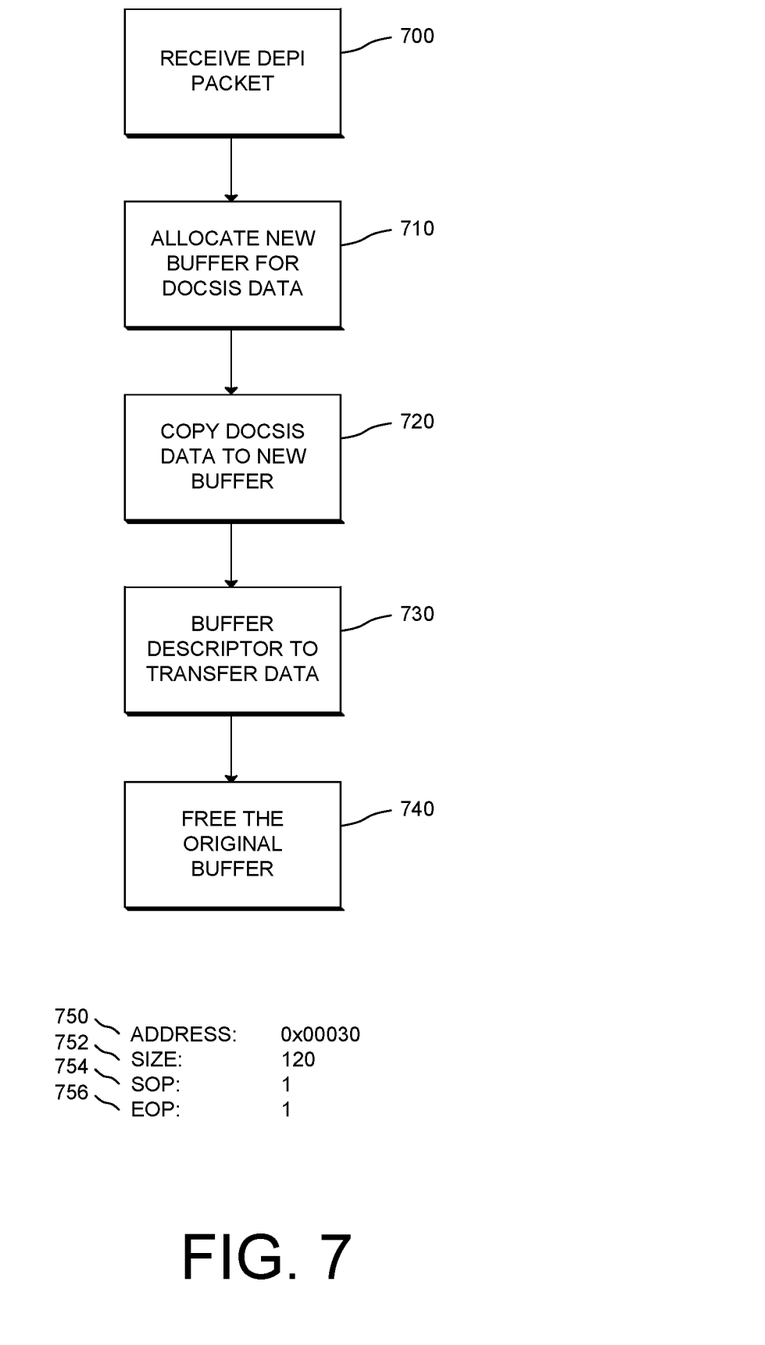
FIG. 7 illustrates processing a DEPI packet.

Referring to FIG. 7, the termination of the DEPI packet 600 and the encoding of the DOCSIS data involves a series of computationally expensive processes. Initially, the remote fiber node 430 receives the DEPI packet 700 which is stored in memory. The remote fiber node 430 allocates a new buffer 710 having a sufficient size to store the DOCSIS data 650 therein. The remote fiber node 430 copies 720 the DOCSIS data 650 to the new buffer 710. The remote fiber node 430 defines a buffer descriptor structure 730 that includes the copied DOCSIS data 720 which is encoded and transmitted to the corresponding cable modem/set top box 460. By way of example, the incoming DEPI packet address of the start of the DOCSIS data may be 0x00010 660. By way of example, the copied start of the DOCSIS data may be 0x00030 750. By way of example, the size of the DOCSIS data may be 120 bytes 752. By way of example, the buffer descriptor structure may indicate the start of a packet with a SOP=1 754 and may indicate the end of a packet with an EOP=1 756. Other indications may be used to indicate the start of a packet and/or other indications may be used to indicate the end of a packet, as desired. In this manner, the buffer descriptor structure 730 may include a buffer address of 0x00030, a size of 120, a SOP=1, and an EOP=1. After completing the transfer to suitable hardware of the remote fiber node 430 for encoding the data for transmission to the cable modem/set top box 460, the new buffer 720 is freed up 740 for additional data. It is noted that the SOP and/or EOP may be in the form of a flag, if desired.

As it may be observed, copying data to a new buffer, freeing up the original buffer, and repeating this process over and over tends to result in issues related to cache trash and consumes a substantial amount of computing resources. Also, since the DOCSIS data 650 from one DEPI packet 600 may include data for multiple different channels, the data is typically defragmented and selectively transmitted to a corresponding set of cable modems/set top boxes 460, which consumes a substantial amount of computing resources. Moreover, the copying of data from the incoming data buffer, which may include cache memory associated with a processing core and/or non-cache memory, to the new buffer is a process that consumes a substantial amount of computational resources. In most cases, the processor accesses the incoming memory and the new buffer multiple times to complete the memory copy, which further consumes a substantial amount of computing resources. In a multi-core environment where multiple cores are simultaneously terminating DEPI packets and performing data forwarding the problem of cache contention is exasperated.

To decrease the amount of computing resources used to processes the received DEPI packets, it is desirable to form a DOCSIS packet that (may include MPEG) on the fly without a memory copy based upon a direct memory access (DMA) technique to transfer the received DOCSIS data 650 to be encoded and transmitted to the corresponding cable modem/set top box 460, which alleviates the need to copy the entire received DOCSIS data 650. In general, direct memory access permits selected hardware systems to access main system memory in a manner at least mostly independent of the central processor. Typically, with direct memory access the central processor initiates the transfer with a direct memory access controller, then it performs other operations while the transfer is in process, and then the central processor receives an interrupt from the direct memory access controller when the transfer operation is completed.

Figure 8:
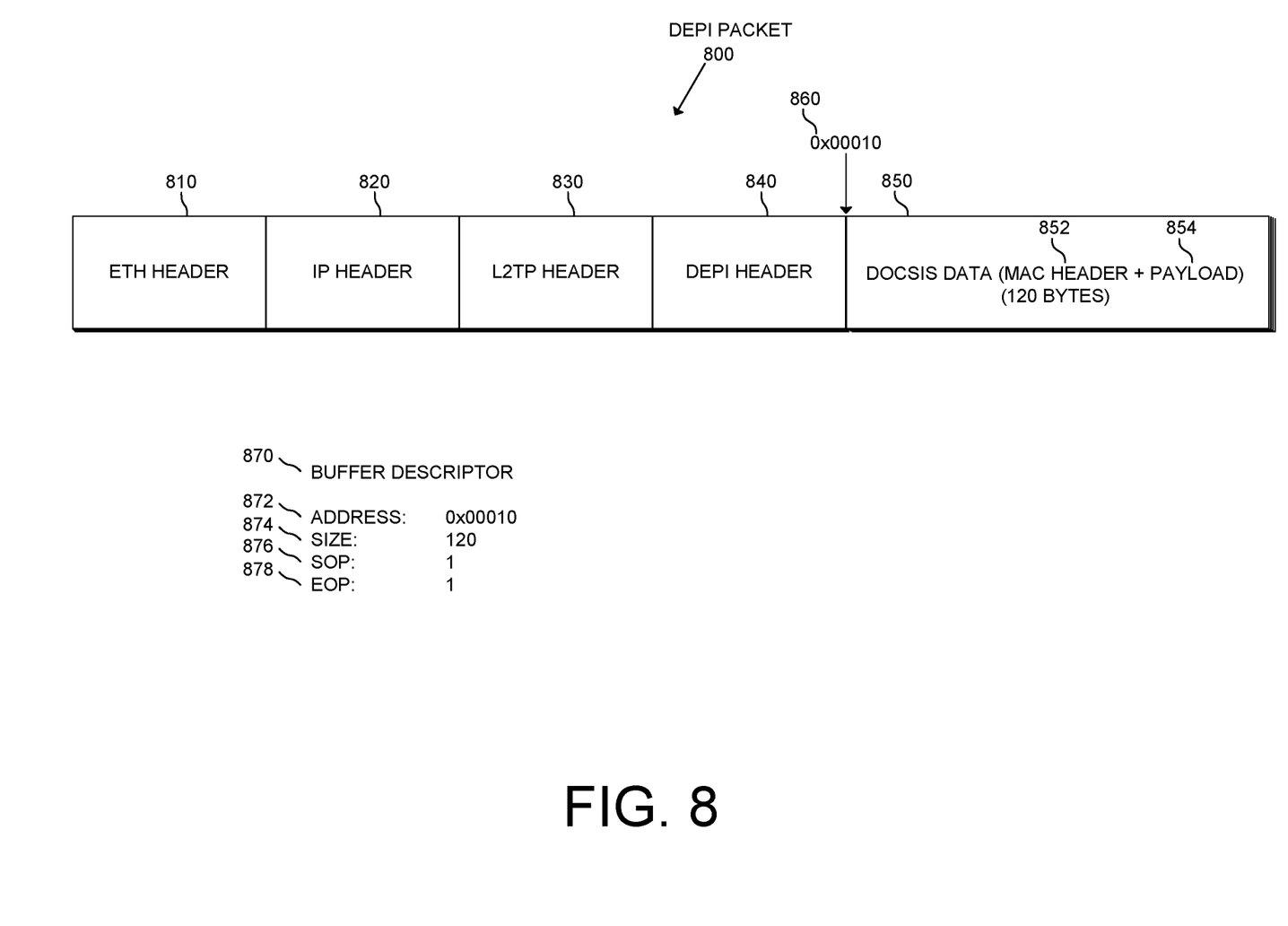
FIG. 8 illustrates modified processing of a DEPI packet.

Referring to FIG. 8, a simplified view of an exemplary DEPI packet 800 is illustrated. The DEPI packet 800 includes an ETH Header 810, an IP Header 820, a L2TP Header 830, a DEPI Header 840, and DOCSIS data 850. The DOCSIS data 850 includes a MAC header 852 and a payload 854 to facilitate transmission of the payload 854 by the remote fiber node based upon the MAC header 852. The remote fiber node 430 terminates the DEPI packet 800 and forms a DOCSIS packet based upon the DOCSIS data 850 that is then encoded for transmission to the cable modem/set top box, such as using an analog QAM modulation provided to a coaxial cable interconnected to the cable modem/set top box. By way of example, the incoming DEPI packet address of the start of the DOCSIS data may be 0x00010 860. Rather than undertake the computationally intensive process of copying the DOCSIS data to a new buffer, the remote fiber node 430 may define a buffer descriptor structure 870 that includes a buffer address of 0x00010 872, a buffer size of 120 (size of DOCSIS data) 874, a SOP=1 876, and an EOP=1 878. The SOP=1 and the EOP=1 bracketing the DOCSIS data indicates that the data being provided is a complete packet of data that is being encoded and transmitted. The DOCSIS data 850 defined by the buffer descriptor structure is encoded and transmitted to the corresponding cable modem/set top box 460. As a result, the computational efficiency of the computer system is increased, such as increasing the effective performance of the computing system, increase in the data forwarding rate, and a substantial reduction in cache trash.

In general, the remote fiber node may support numerous kinds of services. For example, the services may include data traffic, video traffic, NDF traffic, DOCSIS 3.0 traffic, DOCSIS 3.1 traffic, out of band traffic, SCTE 55-1 traffic, and/or SCTE 55-2 traffic. The remote fiber node, that typically includes one or more field programmable gate arrays, is preferably provided data in the DEPI packet indicating which type of service the DOCSIS data is associated with. By providing an indication of the type of service, the field programmable gate array(s) of the remote fiber node can switch to an appropriate data path to provide an appropriate service to an appropriate cable modem/set top box in a more efficient manner.

Figure 9:
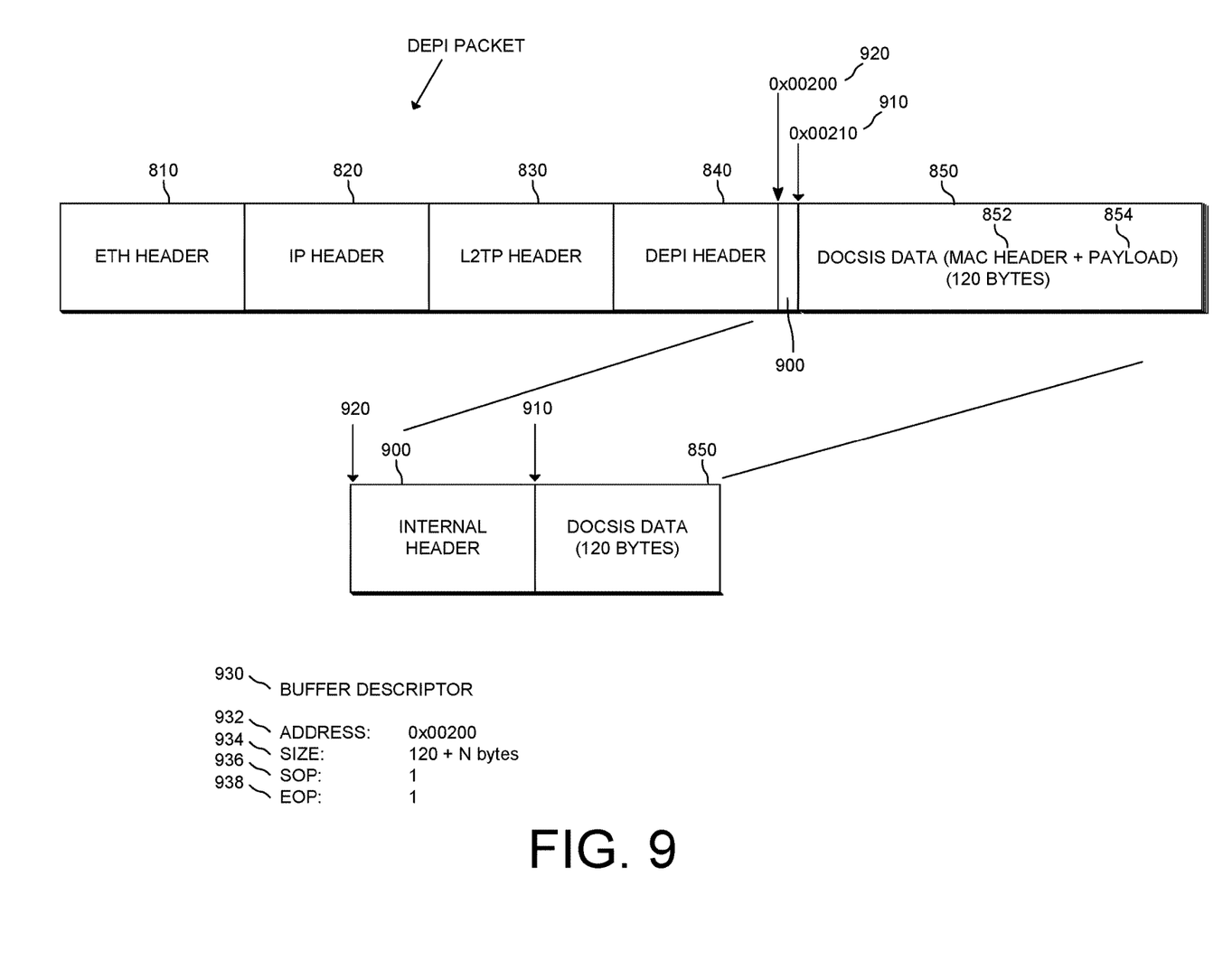
FIG. 9 illustrates modified processing of a DEPI packet with an internal header.

Referring to FIG. 9, one technique to provide an indication of the associated type of service for the DOCSIS data 850 is prepending an internal header 900 before the DOCSIS data 850. After the DEPI packet is received by the remote fiber node, processed in any suitable manner, the DEPI header 840 is no longer necessary for being provided to the cable modem/set top box. The internal header 900 preferably overwrites at least a portion of the DEPI header 840. By way of example, the starting address for the DOCSIS data 850 may be 0x00210 910. By way of example, the starting address for the internal header 900 may be 0x00200 920.

The remote fiber node 430 may define a buffer descriptor structure 930 that includes a buffer address of 0x00200 932, a buffer size of 120 (size of DOCSIS data)+N bytes for the internal header 934, a SOP=1 936, and an EOP=1 938. The SOP=1 and the EOP=1 bracketing the DOCSIS data indicates that the data being provided is a complete packet of data that is being encoded and transmitted. The DOCSIS data 850 plus internal header 900 defined by the buffer descriptor structure 930 is encoded and transmitted to the corresponding cable modem/set top box 460. As a result, the computational efficiency of the computer system is further increased.

Figure 10:
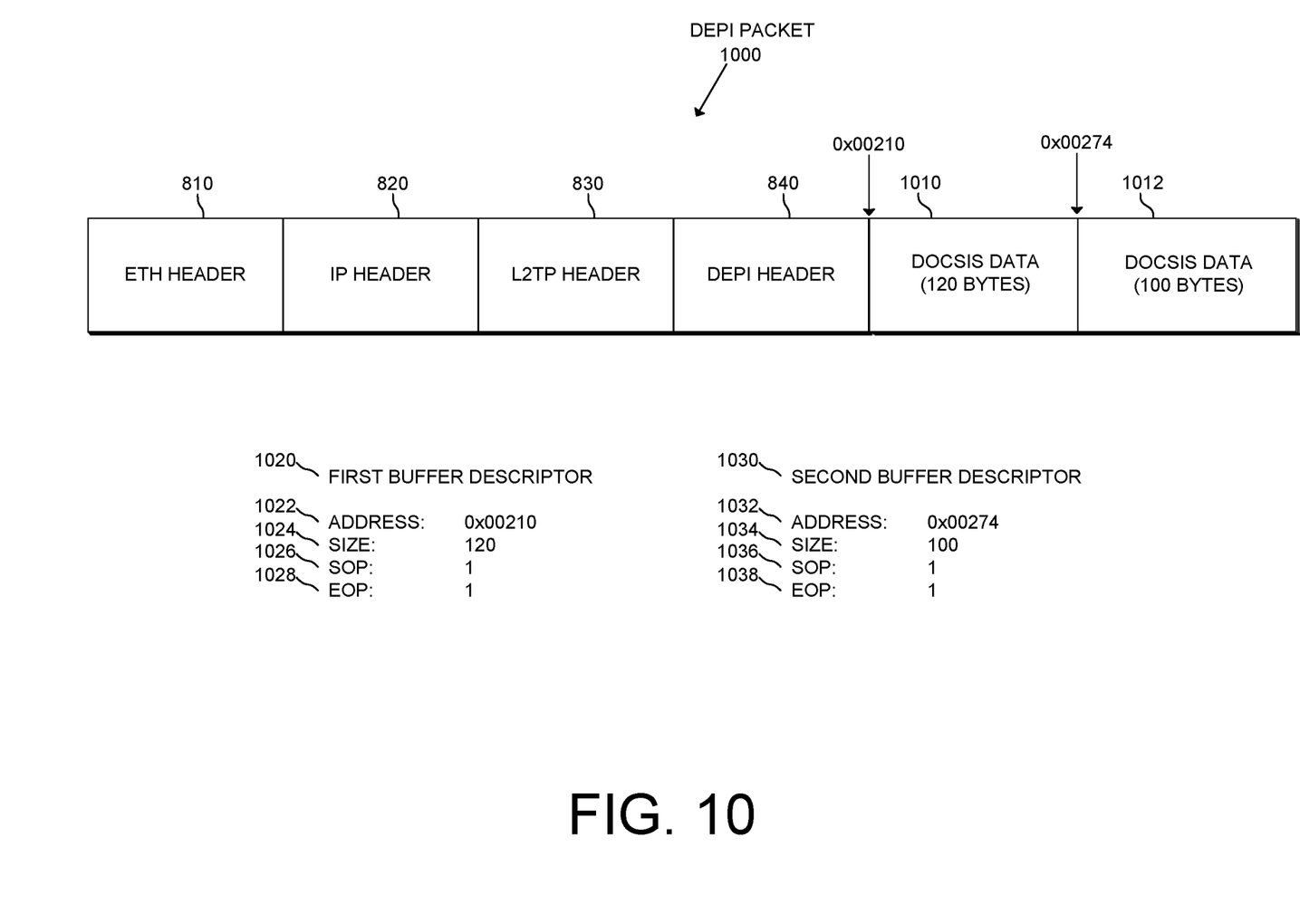
FIG. 10 illustrates modified processing of multiple DOCSIS packets within a DEPI packet.

Referring to FIG. 10, in some cases a single DEPI packet 1000 may include a plurality of DOCSIS data packets 1010, 1012, etc. Each of the DOCSIS data packets 1010 (e.g., 120 bytes), 1012 (e.g., 100 bytes), may be encoded and transmitted in a separate buffer descriptor. Each of the buffer descriptors may include a respective SOP=1 and EOP=1 bracketing the respective DOCSIS data to indicate that the data being provided is a respective complete packet of data that is being encoded and transmitted.

The remote fiber node 430 may define a first buffer descriptor structure 1020 that includes a buffer address of 0x00210 1022, a buffer size of 120 (size of DOCSIS data) 1024, a SOP=1 1026, and an EOP=1 1028. The SOP=1 and the EOP=1 bracketing the DOCSIS data indicates that the data being provided is a complete packet of data that is being encoded and transmitted. The remote fiber node 430 may define a second buffer descriptor structure 1030 that includes a buffer address of 0x00274 1032, a buffer size of 100 (size of DOCSIS data) 1034, a SOP=1 1036, and an EOP=1 1038. The SOP=1 and the EOP=1 bracketing the DOCSIS data indicates that the data being provided is a complete packet of data that is being encoded and transmitted. The DEPI header provides the information indicating the service for each of the DOCSIS data packets, such as the number of packets, which channel for each of the packets, the length of each of the packets, etc. As a result, the computational efficiency of the computer system is further increased.

As it may be observed, each DOCSIS data, which may be directed to the same or different service, is included in a different buffer descriptor. It may also be observed that the system provides different addresses of the same packet buffer in different buffer descriptors for respective DOCSIS data packets. It is further desirable to include a reference count of the number of DOCSIS data packets included with the packet buffer. Each time a DOCSIS data packet is encoded and transmitted based upon a buffer descriptor, the reference count is decreased by 1. When the buffer count reaches zero, the memory associated with the packet buffer is freed so it can be reused for subsequent packet(s) processing.

In some cases, a single DOCSIS data packet may be fragmented across multiple DEPI packets. In the case of the such fragmentation, it is desirable to provide an efficient manner of encoding and transmitting the data to the cable modem/set top box. By use of a plurality of buffer descriptors indicating a series of different memory ranges, together with selective use of SOP=0/1 and EOP 0/1, an effective encoding and transfer may be achieved.

Figure 11:
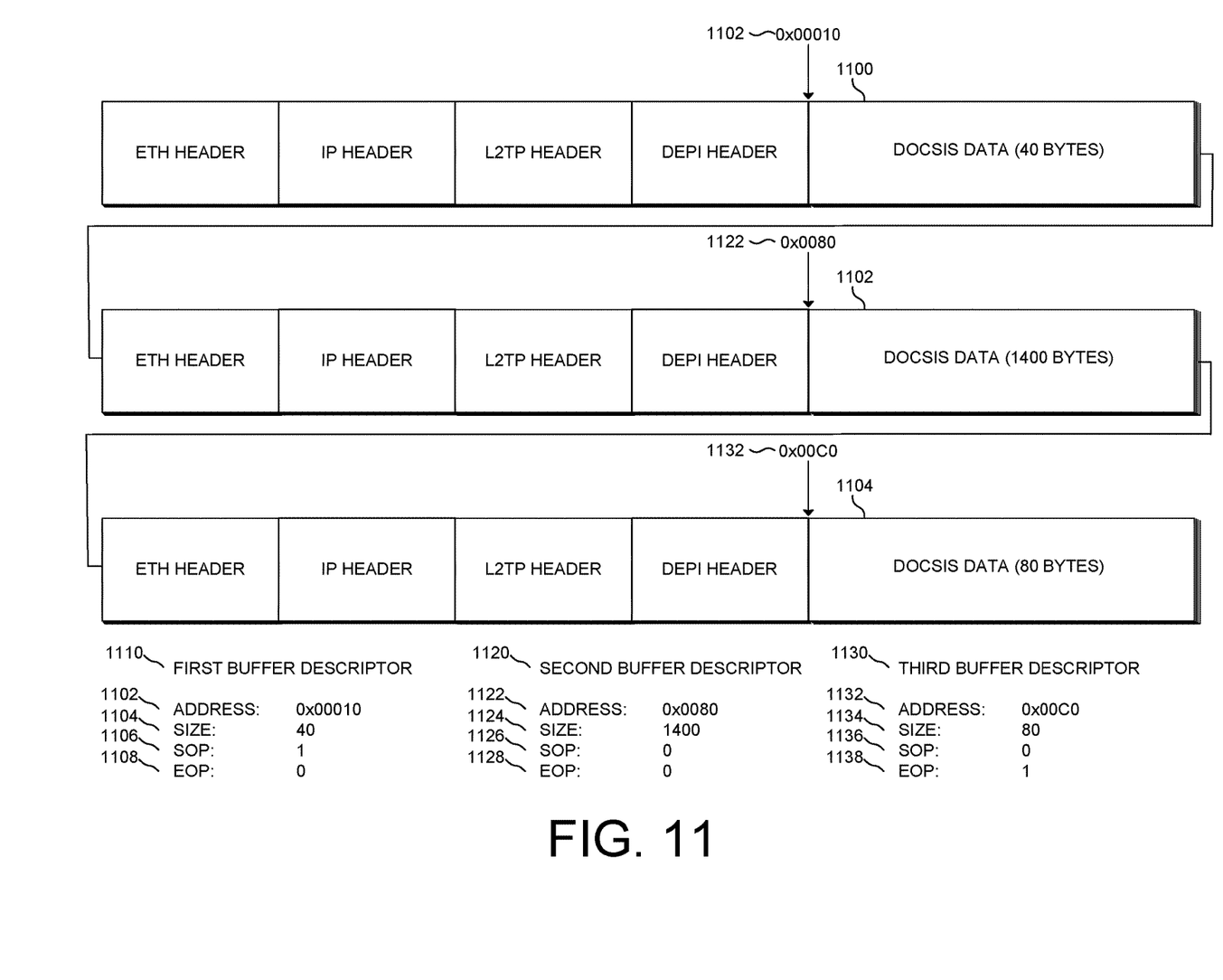
FIG. 11 illustrates modified processing of a DOCSIS packet spanning across different DEPI packets.

Referring to FIG. 11, by way of example, a series of DEPI packets may be received by the remote fiber node where the one DOCSIS data packet for a cable modem/set top box is fragmented across multiple DEPI packets. The DOCSIS data packet may be the combination of the first DOCSIS data segment of 40 bytes 1100, the second DOCSIS data segment of 1400 bytes 1102, and the third DOCSIS data segment of 80 bytes 1104 for a particular service.

The remote fiber node 430 may define a first buffer descriptor structure 1110 that includes a buffer address of 0x00010 1102, a buffer size of 40 (size of DOCSIS data) 1102, a SOP=1 1106, and an EOP=0 1108. The SOP=1 indicates that the data being provided is the start of a packet of data that is being encoded and transmitted. The EOP=0 indicates that the data being provided is not the end of the packet of data that is being encoded and transmitted. The remote fiber node 430 may define a second buffer descriptor structure 1120 that includes a buffer address of 0x0080 1122, a buffer size of 1400 (size of DOCSIS data) 1124, a SOP=0 1126, and an EOP=0 1128. The SOP=0 indicates that the data being provided is not the start of a packet of data that is being encoded and transmitted. The EOP=0 indicates that the data being provided is not the end of the packet of data that is being encoded and transmitted. The remote fiber node 430 may define a third buffer descriptor structure 1130 that includes a buffer address of 0x00C0 1132, a buffer size of 80 (size of DOCSIS data) 1134, a SOP=0 1136, and an EOP=1 1138. The SOP=0 indicates that the data being provided is not the start of a packet of data that is being encoded and transmitted. The EOP=1 indicates that the data being provided is the end of the packet of data that is being encoded and transmitted. The SOP=1 and the EOP=1, bracketing the three DOCSIS data packets, indicates that the data being provided is a complete packet of data that is being encoded and transmitted, albeit in a fragmented manner. The respective DEPI headers provides the information indicating the service for each of the DOCSIS data packets, such as the number of packets, which channel for each of the packets, the length of each of the packets, etc. As a result, the computational efficiency of the computer system is further increased.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A cable distribution system that includes a headend connected to a plurality of customer devices through a transmission network that includes a remote fiber node that converts digital data to analog data suitable for said plurality of customer devices, where said remote fiber node includes a processor, comprising:
(a) said remote fiber node receiving a downstream external protocol interface packet that includes a downstream external protocol interface header portion and a data portion in memory, where both said downstream external protocol interface header portion and said data portion correspond to the same downstream external protocol interface packet;
(b) said remote fiber node encoding and transmitting said data portion to at least one of said plurality of customer devices; and
(c) wherein said data portion is transferred from said memory based upon a buffer descriptor that is stored in a memory location that previously stored a portion of said downstream external protocol interface header portion with an internal header for said encoding.

2. The cable distribution system of claim 1 wherein said downstream external protocol interface packet includes (1) said header portion including a network header, a protocol header, a tunneling header, a protocol header, and (2) said data portion including a data payload.

3. The cable distribution system of claim 2 wherein said network header is Ethernet, said protocol header is an IP header, said tunneling header is at least one of a layer 2 tunnel protocol and a layer 3 tunnel protocol, said protocol header is a DEPI header, and said data payload includes DOCSIS data.

4. The cable distribution system of claim 3 wherein said downstream external protocol interface packet includes multiple channels.

5. The cable distribution system of claim 4 wherein said multiple channels includes at least one of a data traffic, a video traffic, a NDF traffic, a DOCSIS 1.0 traffic, a DOCSIS 2.0 traffic, a DOCSIS 3.0 traffic, a DOCSIS 3.1 traffic, an out of band traffic, a SCTE 55-1 traffic, and a SCTE 55-2 traffic.

6. The cable distribution system of claim 5 wherein said downstream external protocol interface packet is encapsulated as a DOCSIS MPEG Transport that includes DOCSIS frames over MPEG over L2TP.

7. The cable distribution system of claim 5 wherein said downstream external protocol interface packet is encapsulated as a packet streaming protocol streaming DOCSIS frames over L2TP.

8. The cable distribution system of claim 1 wherein said remote fiber node encoding and transmitting said data portion includes analog QAM modulation.

9. The cable distribution system of claim 1 wherein said data portion is transferred from said memory using direct memory access for said encoding free from being copied to another portion of said memory.

10. The cable distribution system of claim 1 wherein a direct memory access to transfer said buffer descriptor is performed based upon a direct memory access controller.

11. The cable distribution system of claim 1 wherein said buffer descriptor is a structure that includes an address in said memory.

12. The cable distribution system of claim 11 wherein said buffer descriptor further includes a size.

13. The cable distribution system of claim 12 wherein said buffer descriptor further includes a start of packet indicator and an end of packet indicator.

14. The cable distribution system of claim 11 wherein said address in said memory is the same as a memory address of said data portion.

15. The cable distribution system of claim 1 wherein said data portion includes a plurality of data packets.

16. The cable distribution system of claim 1 wherein said remote fiber node encoding and transmitting a first portion of said data portion to a first one of said plurality of customer devices and said remote fiber node encoding and transmitting a second portion of said data portion to a second one of said plurality of customer devices.

17. The cable distribution system of claim 1 wherein said remote fiber node receiving a plurality of said downstream external protocol interface packets that include a respective said header portion and said data portion in said memory, said remote fiber node encoding and transmitting said respective data portions of said respective said downstream external protocol interface packets to one of said plurality of customer devices as a single packet.

18. A cable distribution system that includes a headend connected to a plurality of customer devices through a transmission network that includes a remote fiber node that converts received data to data suitable for said plurality of customer devices, where said remote fiber node includes a processor, comprising:
(a) said remote fiber node receiving a downstream external protocol interface packet that includes a downstream external protocol interface header portion and a data portion in memory, where both said downstream external protocol interface header portion and said data portion correspond to the same downstream external protocol interface packet;
(b) said remote fiber node encoding and transmitting said data portion to at least one of said plurality of customer devices; and
(c) wherein said data portion is transferred from said memory based upon a buffer descriptor that is stored in a memory location that previously stored a portion of said downstream external protocol interface header portion with an internal header for said encoding.

* * * * *